Patented Dec. 30, 1947

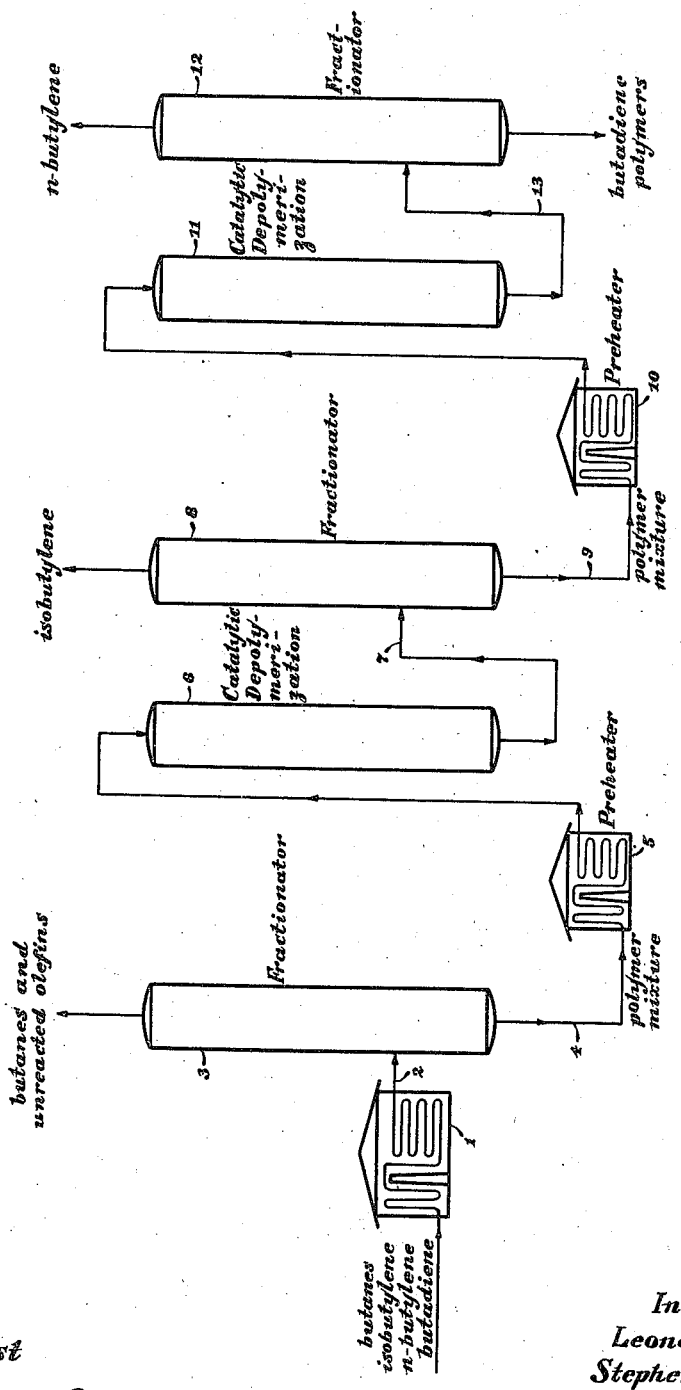

2,433,465

UNITED STATES PATENT OFFICE 2,433,465

PROCESS FOR EFFECTING THE SEPARATION OF A MONOOLEFIN FROM A DIOLEFIN

Leonard N. Leum, Upper Darby, Stephen J. Macuga, Lansdowne, and Saul I. Kreps, Philadelphia, Pa., assignors to The Atlantic Refining Company, Philadelphia, Pa., a corporation of Pennsylvania Application July 23, 1943, Serial No. 495,949

14 Claims. (Cl. 260—677)

This invention relates to the separation of hydrocarbon mixtures the components of which are difficultly separable by ordinary fractionation methods by reason of the close relationship of their vapor pressures. The invention is particularly valuable as providing a practical and economical method for effecting the isolation of isobutylene and butadiene from admixture with other hydrocarbons of four carbon atoms, i. e., alpha and beta butylene, normal and iso-butane.

In the production of various products involving the use of isobutylene and/or butadiene, it has been found necessary to employ these compounds in substantially pure form. Thus, in the production of "butyl" rubber by the reaction of isobutylene and butadiene, or of "Vistanex" by the homopolymerization of isobutylene, and in the manufacture of high molecular weight isobutylene polymers as agents for increasing the viscosity index or reducing the pour point of lubricating oil, the isobutylene must be of a relatively high degree of purity. Also, in the production of high anti-knock gasoline without the use of tetraethyl lead by the hydrogenation of iso-octene, the isobutylene utilized in the preparation of the iso-octene must be substantially pure.

In the treatment of cracked distillates, it is relatively easy, by ordinary fractionation, to produce a fraction consisting of or predominating in hydrocarbons of four carbon atoms. The production of a fraction consisting of or predominating in hydrocarbons of five carbon atoms can likewise be accomplished without great difficulty by ordinary fractionation. The isolation of the individual components of a C4 or C5 hydrocarbon fraction by ordinary fractionation, however, is commercially impractical because of the very little difference existing between the vapor pressures of the components of such fractions, and other measures are consequently necessary.

Various methods have been heretofore proposed for effecting the separation of hydrocarbon mixtures containing components of similar vapor pressures. Most of such methods do not provide for the separation of components of the same degree of unsaturation, i. e., isobutylene and alpha or beta butylene, and are further disadvantageous in that they require special equipment such as towers containing an inordinately large number of plates and/or costly or difficultly procurable solvents for their execution. Other of the prior art processes, while easily carried out in the laboratory do not lend themselves to commercial application. For example, it is known that the separation of butadiene from hydrocarbon mixtures containing butadiene together with a butylene may be readily achieved by treating the mixture with an aqueous solution of cuprous chloride and ammonium chloride, butadiene being selectively precipitated as an insoluble copper complex from which it is later regenerated. This method of recovering butadiene from narrow boiling mixtures with butylene is not adapted to commercial scale operation, wherein it is desirable to contact the solution and mixture to be separated in a continuous countercurrent manner, because the insoluble butadiene-copper complex clogs the tower, giving rise to extreme operating difficulties.

It is a principal object of the present invention to provide a process for separating hydrocarbons of similar vapor pressures which may be inexpensively operated in standard equipment, which does not entail the employment of chemical agents such as cuprous chloride, and which does not depend for its successful execution upon the selectivity characteristics of an auxiliary solvent.

The present invention, whereby the foregoing and other objects are achieved, is based on the discovery that when a mixture of olefins of similar vapor pressures, including one or more diolefins, is polymerized to yield a polymer mixture containing various polymers and copolymers of the olefins and the polymer mixture heated in the presence of a depolymerization catalyst, the composition of the resulting gas depends on the temperature employed.

The process of the invention may be utilized to effect the separation of an iso-olefin from a diolefin, or of a normal olefin from a diolefin, or of both an iso-olefin and a normal olefin from a diolefin, in which event the iso-olefin and normal olefin may be separated from each other. Although particularly adapted to the separation of C4 fractions, the process may be effectively applied, for example, to the treatment of a narrow boiling fraction comprising an iso-amylene and/or a normal amylene and a pentadiene. Paraffin hydrocarbons may or may not be present in a mixture subjected to treatment. If present, they are usually separated as a group.

The process will be particularly described as applied to the separation of a narrow boiling hydrocarbon mixture containing a diolefin and both an iso- and a normal olefin. As so applied, the process is executed by subjecting the mixture to a polymerization treatment to effect the substantially complete polymerization of the olefinic components thereof, contacting the resulting polymers with a depolymerization catalyst at a temperature sufficient to reproduce the iso-olefin in monomeric form, separating the reproduced monomeric iso-olefin from the unconverted polymers, contacting the unconverted polymers with a depolymerization catalyst at a temperature sufficient to reproduce the normal olefin in monomeric form, and separating the reproduced monomeric normal olefin from the unconverted polymers still remaining.

The depolymerization catalysts which may be employed in the execution of the process include argillaceous adsorbents such as fuller's earth, bentonite, acid activated bentonite or clay, bauxite, activated alumina, oxides or sulfides of metals of group VI of the periodic system, alkaline earth metal oxides, rare earth oxides, or mineral acids such as phosphoric acid, metaphosphoric acid or pyrophosphoric acid which may or may not be supported upon carriers such as diatomaceous earth, clay, titania, thoria, or the like. Of the catalysts mentioned, the clays are preferred because of their ready availability and relative cheapness.

The polymerization of the olefinic components of the mixture to be separated may or may not involve the use of a polymerization catalyst. In effecting the separation of $C_4$ fractions according to the invention, we have found it preferable, when carrying out the polymerization thermally in the absence of a catalyst, to maintain the operating temperature within the range of from 600° F. to 1000° F. and to operate under a super-atmospheric pressure of from 500 to 2000 p. s. i. The thermal polymerization may be carried out in any suitable type of apparatus but usually a vertical reactor is employed in which the effluent gases can sweep high molecular weight polymers out of the reaction zone. Unless such provision is made for removal of heavy polymers, considerable coke formation may occur in the reaction vessel.

Following the polymerization of the olefinic components, any paraffin hydrocarbons which may have been present in the original mixture are separated as by fractionation.

In the first of the two catalytic depolymerization treatments a temperature is preferably employed which does not give rise to the presence of more than minor amounts of monomeric normal olefin and monomeric diolefin in the gas resulting from the treatment. Such temperature is usually lower than the temperature at which the second catalytic depolymerization treatment is executed, and in the instance of a polymer mixture obtained by the polymerization of a mixture comprising isobutylene, butadiene, and a normal butylene, we have found it advantageous to maintain the operating temperature within the range of from 400° F. to 800° F., the optimum temperature depending primarily upon the depolymerization catalyst being employed. We have found in using fuller's earth that a temperature of 600° F. to 800° F. gives the best results, while with a catalyst such as phosphoric acid on a diatomaceous earth, a temperature of from 400° F. to 700° F. is recommended.

In the second depolymerization treatment, the catalyst may be the same as that employed in the first treatment, or a different catalyst may be used. Thus, the first treatment may be carried out using fuller's earth or bentonite, and the second with one of the other catalysts mentioned. Most preferably, the temperature during the second depolymerization treatment is kept within the range of from 800° F. to 1000° F., but temperatures up to 1200° F. may be employed. Also it is possible to operate at a temperature lower than 800° F. depending upon the catalysts being used. Since we have found that dimeric butadiene tends to become converted to less desirable products at temperatures substantially in excess of 900° F., it is our practice in the separation of $C_4$ hydrocarbon mixtures according to the invention, to execute the second depolymerization treatment at a temperature not substantially exceeding 900° F. when the polymer mixture contains dimeric butadiene.

The catalytic depolymerization treatments are preferably conducted at atmospheric pressure, but may be conducted at a subatmospheric or superatmospheric pressure. The rate of charge of the polymers to the heated catalyst, which may be contained within any suitable type of reaction vessel, may range from 0.5 to 5.0 volumes of polymers per volume of catalyst per hour. Upon becoming spent by reason of the accumulation of carbonaceous materials, the catalyst may be regenerated by treatment with an appropriate solvent or by calcination in the presence of air or by a combination of such methods.

The invention will be readily understood from the accompanying flow diagram in which minor elements such as pumps, valves, heat exchangers, condensers, and the like have been omitted for sake of simplicity. Proper placement of these auxiliaries will at once be evident to those skilled in the art to which the invention relates.

In explanation of the diagram, a hydrocarbon mixture of narrow boiling range, shown as a mixture of normal and isobutane with isobutylene, a normal butylene, and butadiene, is introduced into a tubular furnace 1 wherein the substantially complete polymerization of the olefinic constituents of the mixture is effected. The effluent gas from the furnace comprising polymeric isobutylene, a polymer of the normal butylene, a copolymer of isobutylene and the normal butylene, polymeric butadiene, and copolymers of butadiene and the monobutylenes, is led via line 2 to a fractionator 3 operated to separate the butanes and any unreacted olefins.

The bottoms from the fractionator 3 consisting of the polymerized olefins are conveyed, via line 4, to a tubular furnace or preheater 5 and thence to a column or chamber 6 which contains an appropriate quantity of a suitable depolymerization catalyst, for example, fuller's earth. A gas containing monomeric isobutylene is withdrawn from the column 6 via line 7 to a fractionating column 8 wherein the monomeric isobutylene is separated.

Where as in the present case the polymer mixture conveyed to column 6 comprises an iso-olefin-normal olefin copolymer, all or a part of such copolymer may depolymerize along with the polymer of the iso-olefin. This has relatively little effect on the purity of the iso-olefin overhead of fractionator 8. Apparently the monomeric normal olefin resulting from the depolymerization of the copolymer immediately repolymerizes with itself to yield homopolymers which are not depolymerizable at the temperatures at which column 6 is operated.

The unconverted polymers constituting the bottom product of the fractionating column 8 are conveyed via line 9 to a tubular furnace or preheater 10 and thence to a column 11 which may be identical with column 6. The temperature at which column 11 is operated is in all cases higher than the temperature at which column 6 is operated if the same catalyst is being used in both columns. Thus, when both columns contain fuller's earth as the depolymerization catalyst, column 6 will be operated at a temperature of from 600° F. to 800° F., while the temperature in column 11 may approach 1200° F. although it is preferable, as previously indicated, where the polymer mixture introduced into column 11 comprises dimeric butadiene to maintain column 11 at a temperature which does not substantially exceed 900° F.

The monomeric normal butylene produced by the depolymerization reaction in column 11 is separated by fractionator 12 to which the product of column 11 is conveyed via line 13. The bottoms from the fractionating column 12 comprise the butadiene polymers plus other polymers not reacted by either of the catalytic depolymerization treatments. These other polymers may be separated from the butadiene polymer by any suitable method after which the butadiene polymers may be cracked, if desired, to yield monomeric butadiene.

We have said that where the polymer mixture conveyed to column 6 comprises an iso-olefin-normal olefin copolymer, all or part of such copolymer may be depolymerized therein, and that apparently the resulting monomeric normal olefin immediately repolymerizes with itself to yield homopolymers which are not depolymerizable at the temperatures at which column 6 is operated. It also seems apparent from the results we have obtained that any monomeric diolefin produced either as a consequence of the reaction in column 6 or as a consequence of the reaction in column 11 immediately polymerizes additively to give homopolymers which do not depolymerize at the temperatures observed in the operation of these columns. Our invention, however, is not predicated on the accuracy of any theory advanced herein.

Although the invention has been particularly described with reference to the separation of a hydrocarbon mixture containing both an iso-olefin and a normal olefin, it will be understood that it is equally applicable to the separation of a mixture containing a diolefin and one or more normal olefins in the absence of an iso-olefin, or to a mixture comprising an iso-olefin and a diolefin in the absence of a normal olefin. Where the mixture to be separated contains an iso-olefin in the absence of any normal olefin or vice versa, the second of the catalytic depolymerization units including the adjacent fractionator and preheater may be omitted, or if retained in order to increase through-put, may be operated at the same temperature as the first.

We claim:

1. A process for effecting the separation of a mono-olefin from a diolefin of similar vapor pressure which comprises subjecting a mixture containing the mono-olefin and the diolefin to a non-selective polymerization treatment, contacting the resulting polymers with a depolymerization catalyst at a temperature sufficient to reproduce the mono-olefin in monomeric form, and separating the reproduced monomeric mono-olefin from the unconverted polymers.

2. A process for effecting the separation of a hydrocarbon mixture containing an iso-olefin, a normal olefin, and a diolefin of similar vapor pressures which comprises subjecting the mixture to a non-selective polymerization treatment, contacting the resulting polymers with a depolymerization catalyst at a temperature sufficient to reproduce the iso-olefin in monomeric form, separating the reproduced monomeric iso-olefin from the unconverted polymers, contacting the unconverted polymers with a depolymerization catalyst at a temperature sufficient to reproduce the normal olefin in monomeric form, and separating the reproduced monomeric normal olefin from the unconverted polymers still remaining.

3. A process for effecting the separation of a mono-olefin from a diolefin of similar vapor pressure which comprises subjecting a mixture containing the mono-olefin and the diolefin to a non-selective polymerization treatment, contacting the resulting polymers with a depolymerization catalyst at a temperature between 400° F. and 1200° F. to reproduce the mono-olefin in monomeric form, and separating the reproduced monomeric mono-olefin from the unconverted polymers.

4. A process for effecting the separation of a hydrocarbon mixture containing an iso-olefin, a normal olefin and a diolefin of similar vapor pressures which comprises subjecting the mixture to a non-selective polymerization treatment, contacting the resulting polymers with a depolymerization catalyst at a temperature between 400° F. and 800° F. to reproduce the iso-olefin in monomeric form, separating the reproduced monomeric iso-olefin from the unconverted polymers, contacting the unconverted polymers with a depolymerization catalyst at a temperature between 800° F. and 1200° F. to reproduce the normal olefin in monomeric form, and separating the reproduced monomeric normal olefin from the unconverted polymers still remaining.

5. A process for effecting the separation of a mono-olefin of at least four carbon atoms from a diolefin containing a like number of carbon atoms which comprises subjecting a mixture containing the mono-olefin and the diolefin to a non-selective thermal polymerization treatment at a temperature between 600° F. and 1000° F. and at a superatmospheric pressure of from 500 p. s. i. to 2000 p. s. i., contacting the resulting polymers with a depolymerization catalyst at a temperature between 400° F. and 900° F. to reproduce the mono-olefin in monomeric form, and separating the reproduced monomeric mono-olefin from the unconverted polymers.

6. A process for effecting the separation of a hydrocarbon mixture containing an iso-olefin, a normal olefin, and a diolefin of similar vapor pressures which comprises subjecting the mixture to a non-selective thermal polymerization treatment at a temperature between 600° F. and 1000° F. and at a superatmospheric pressure of from 500 to 2000 p. s. i., contacting the resulting polymers with a depolymerization catalyst at a temperature between 400° F. and 800° F. to reproduce the iso-olefin in monomeric form, separating the reproduced monomeric iso-olefin from the unconverted polymers, contacting the unconverted polymers with a depolymerization catalyst at a temperature between 800° F. and 900° F. to reproduce the normal olefin in monomeric form, and separating the reproduced monomeric normal olefin from the unconverted polymers still remaining.

7. A process for effecting the separation of a butylene from butadiene which comprises subjecting a mixture containing the butylene and butadiene to a non-selective polymerization treatment, contacting the resulting polymers with a depolymerization catalyst at a temperature sufficient to reproduce the butylene in monomeric

7 form, and separating the reproduced monomeric butylene from the unconverted polymers.

8. A process for effecting the separation of a hydrocarbon mixture containing isobutylene, a normal butylene, and butadiene which comprises subjecting the mixture to a non-selective polymerization treatment, contacting the resulting polymers with a depolymerization catalyst at a temperature sufficient to reproduce the isobutylene in monomeric form, separating the reproduced monomeric isobutylene from the unconverted polymers, contacting the unconverted polymers with a depolymerization catalyst at a temperature sufficient to reproduce the normal butylene in monomeric form, and separating the reproduced monomeric normal butylene from the unconverted polymers still remaining.

9. A process for effecting the separation of a butylene from butadiene which comprises subjecting a mixture containing the butylene and butadiene to a non-selective polymerization treatment, contacting the resulting polymers with a depolymerization catalyst at a temperature between 800° F. and 1200° F. to reproduce the butylene in monomeric form, and separating the reproduced monomeric butylene from the unconverted polymers.

10. A process for effecting the separation of a hydrocarbon mixture containing isobutylene, a normal butylene, and butadiene which comprises subjecting the mixture to a now-selective polymerization treatment, contacting the resulting polymers with a depolymerization catalyst at a temperature between 400° F. and 800° F. to reproduce the isobutylene in monomeric form, separating the reproduced monomeric isobutylene from the unconverted polymers, contacting the unconverted polymers with a depolymerization catalyst at a temperature between 800° F. and 900° F. to reproduce the normal butylene in monomeric form, and separating the reproduced monomeric normal butylene from the unconverted polymers still remaining.

11. A process for effecting the separation of a butylene from butadiene which comprises subjecting a mixture containing the butylene and butadiene to a non-selective thermal polymerization treatment at a temperature between 600° F. and 1000° F. and at a superatmospheric pressure of from 500 to 2000 p. s. i., contacting the resulting polymers with a depolymerization catalyst at a temperature between 400° F. and 900° F. to reproduce the butylene in monomeric form, and separating the reproduced monomeric butylene from the unconverted polymers.

12. A process for effecting the separation of isobutylene from butadiene which comprises subjecting a mixture containing isobutylene and butadiene to a non-selective thermal polymerization treatment at a temperature between 600° F. and 1000° F. and at a superatmospheric pressure of from 500 to 2000 p. s. i., contacting the resulting polymers with a depolymerization catalyst at a temperature between 400° F. and 800° F. to reproduce the isobutylene in monomeric form, and separating the reproduced monomeric isobutylene from the unconverted polymers.

13. A process for effecting the separation of a normal butylene from butadiene which comprises subjecting a mixture containing the normal butylene and butadiene to a non-selective thermal polymerization treatment at a temperature between 600° F. and 1000° F. and at a superatmospheric pressure of from 500 to 2000 p. s. i., contacting the resulting polymers with a depolymerization catalyst at a temperature between 800° F. and 900° F. to reproduce the normal butylene in monomeric form, and separating the reproduced monomeric normal butylene from the unconverted polymers.

14. A process for effecting the separation of a hydrocarbon mixture containing isobutylene, a normal butylene, and butadiene, which comprises subjecting the mixture to a non-selective thermal polymerization treatment at a temperature between 600° F. and 1000° F. and at a superatmospheric pressure of from 500 to 2000 p. s. i., contacting the resulting polymers with a depolymerization catalyst at a temperature between 400° F. and 800° F. to reproduce the isobutylene in monomeric form, separating the reproduced monomeric isobutylene from the unconverted polymers, contacting the unconverted polymers with a depolymerization catalyst at a temperature between 800° F. and 900° F. to reproduce the normal butylene in monomeric form, and separating the reproduced monomeric normal butylene from the unconverted polymers still remaining.

LEONARD N. LEUM.
STEPHEN J. MACUGA.
SAUL I. KREPS.

REFERENCES CITED

The following references are of record in the file of this patent:

UNITED STATES PATENTS

| Number | Name | Date |
|---|---|---|
| 1,282,906 | Mersereau | Oct. 29, 1918 |
| 2,222,055 | Ward | Nov. 19, 1940 |
| 2,178,808 | Rosen et al. | Nov. 7, 1939 |
| 1,894,661 | Brooks | Jan. 17, 1933 |
| 2,320,127 | Hachmuth | May 25, 1943 |
| 2,152,908 | Morrell et al. | Apr. 4, 1939 |
| 2,398,930 | Gary | Apr. 23, 1946 |

FOREIGN PATENTS

| Number | Country | Date |
|---|---|---|
| 9,722 | Great Britain | Apr. 22, 1912 |